Figure 1:
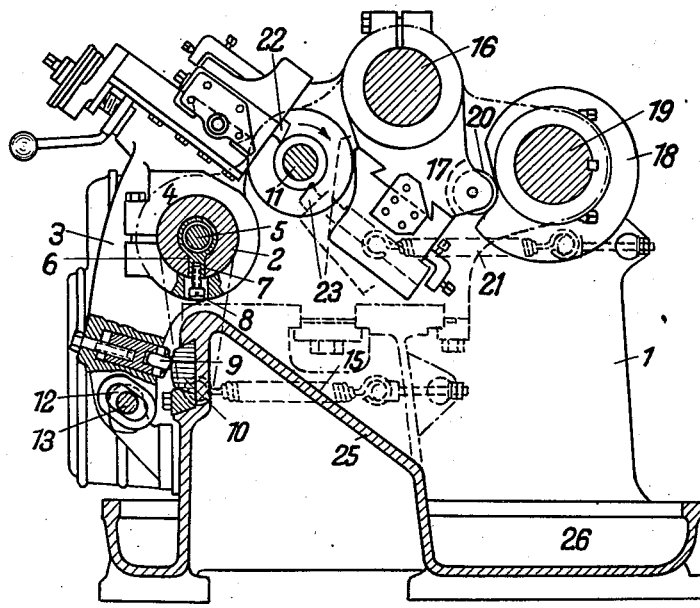

May 18, 1937.  W. MÖBIUS  2,080,830

LATHE

Filed Jan. 8, 1936  4 Sheets-Sheet 1

Inventor:
WALTER MÖBIUS
BY Haseltine, Lake & Co.
Attorneys.

May 18, 1937. W. MÖBIUS 2,080,830
LATHE
Filed Jan. 8, 1936  4 Sheets-Sheet 2

Inventor:
WALTER MÖBIUS
BY Haseltine, Lake & Co.
Attorneys.

May 18, 1937.  W. MÖBIUS  2,080,830
LATHE
Filed Jan. 8, 1936  4 Sheets-Sheet 4
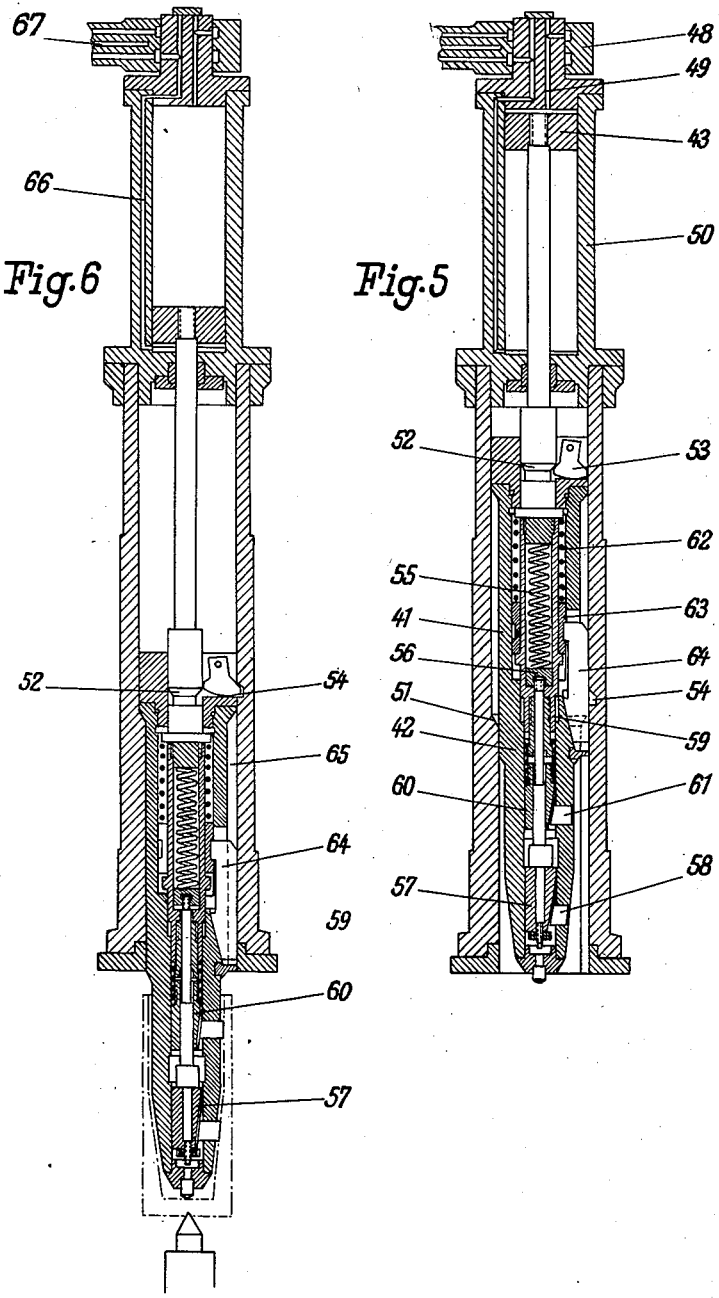
Inventor:
WALTER MÖBIUS
BY Haseltine, Lake & Co.
Attorneys.

Patented May 18, 1937

2,080,830

UNITED STATES PATENT OFFICE 2,080,830

LATHE

Walter Möbius, Magdeburg, Germany

Application January 8, 1936, Serial No. 58,041
In Germany May 5, 1933

9 Claims. (Cl. 82—2)

The invention relates to lathes with which high outputs are obtained by the use of high cutting speeds, in particular when using hard metal tools. With lathes giving high outputs, the forces set up on the carriages carrying the tools are very great, and specially constructed guides must therefore be used for the carriages for ensuring the accuracy of the work.

Therefore, according to the invention, the tool carriage of this lathe is not provided with a plane guide, but is displaceably and rockably mounted on a cylindrical guide, which is a known step in the case of special lathes. In contradistinction to these known arrangements, according to the invention the rocking arm of the tool carriage bears against a guide bar, which may be straight or curved, and which extends over the entire length of the lathe in order to turn the workpiece automatically with only one tool in one working operation.

This arrangement affords considerable advantages, the construction of the entire lathe thereby being naturally considerably simplified. In lathes in which the tool carriage has been provided on a rocking arm, this arm has hitherto been actuated by a control drum which, owing to its size alone, had to be arranged outside the actual lathe. In cases where the tool has great working paths, the cam drum would be given an excessively large circumference and would thereby unfavourably influence the entire construction and operation of the lathe.

This drawback is obviated according to the present invention, because in this case the guide does not take up any appreciable space in the machine tool, which affords the further advantage that the workpiece may be treated over its entire length with one tool, while when the drive was effected by the drum the entire length of path of the steel had to be divided between several tools, to which end a plurality of cam members were provided on the cam drum.

This use of several tools, however, has the disadvantage that no hard metal tools can be employed, because the starting of the lathe with a plurality of hard metal tools is not possible, as they would have to cut into the hard compressed shell of workpieces before they could carry out the longitudinal turning to the complete cutting depth. This requires abnormal driving forces not available in the driving motor, and destroys the edge of the tools owing to the brittleness of the hard metal.

In order further to perfect this lathe with regard to working efficiency and working time, the lathe is also provided with tool holders serving for parting and surfacing. These tool holders must naturally be arranged on the side lying opposite the tool carriage, looking from the workpiece.

In order that here also only tensile forces may be set up during the working, these tool holders are arranged in suspended fashion on rocking arms, the rocking axis of the tool holders therefore lying above the axis of rotation, and the working tools lying below the said axis.

The drive of these suspended rocking tool holders may then be effected by cam discs. In order to simplify the transmission of force inside the machine, the guides for the tool carriages, the tool holders and the driving cams are mounted in arms connected directly with the head stock and the tail stock. The tail stock therefore carries out further functions in addition to those which it carried out in the known lathes, in which it only served to carry the workpiece. It cannot, as before, be adopted to be inserted and removed without previous loosening of the clamping screws on the arm supports, but must be regarded as rigidly connected with the bed of the machine tool and consequently increases the resisting capacity of the machine.

Owing to the fact that the support of the guides for the tool carriage consists of one piece with the tail stock, lateral shearing forces cannot be set up on the latter and inaccuracies in the working owing to displacement of the guiding parts for the tool carriage no longer occur. Vibrations set up in the heaviest cutting operations, which prematurely destroy the tools, are also obviated.

As, in this type of construction of the machine tool, the tail stock cannot be displaced in order to clamp the workpiece, a displaceable clamping mandrel is specially provided for the treatment of vessel-shaped or tubular workpieces, this clamping mandrel being so constructed that it may, on the one hand, be pushed forward over the entire length of the lathe approximately to the bottom of the vessel; on the other hand, the clamping mandrel must be completely forced back into the head stock, in order to release the workpiece and to be able to remove it easily. In this lathe, therefore, the working spindle itself is constructed as a displacement cylinder for the clamping mandrel, the rear part of the mandrel constituting the piston. It is then possible to provide a long mandrel with a considerable stroke inside the working spindle, so that the displacing arrangement of the mandrel project only to a small extent or not at all beyond the end of the spindle. The well mounted lathe spindle thus forms an accurate guide for the piston, so that even when great forces are set up during the treatment of the workpiece inaccuracies are avoided.

This arrangement may be constructed in a particularly favourable manner if the clamping jaws on the clamping mandrel, which engage with the workpiece from the inside, are also automatically actuated. The front part of the piston-like mandrel is then constructed as a clamping device, the displaceable part being provided with inclined surfaces forcing the clamping jaws against the workpiece. The drive of the clamping device is either effected by the same pressure medium with which the piston is displaced (pressure oil or compressed air), or the clamping jaws are actuated mechanically under the action of the pressure medium. The pressure medium is then so controlled that the displacement is first terminated and the clamping then takes place.

In order to use both hard metal tools and high-speed steels in such a lathe, the drive is constructed in a particular manner. With hard metal tools, high turning speeds may be obtained with a small torque. Use is therefore generally made of a worm drive, which ensures a steady and vibrationless drive of the workpiece spindle. However, if it also be desired to use high-speed turning tools on the same lathe with the most complete utilization of the driving motor possible, the workpiece spindle must rotate at a speed which is about four times lower. It would consequently be necessary to use a correspondingly larger worm wheel transmission, for which the restricted space in the head stock is not sufficient. According to the invention, the drive of the workpiece spindle is therefore effected by a plurality of worm gears arranged in juxtaposition, in which the worm wheels are given a relatively small diameter, the maximum sliding speed at the worm and the torque with a given transmission ratio and the predetermined pitch determining the number of worm gears.

Figure 2:
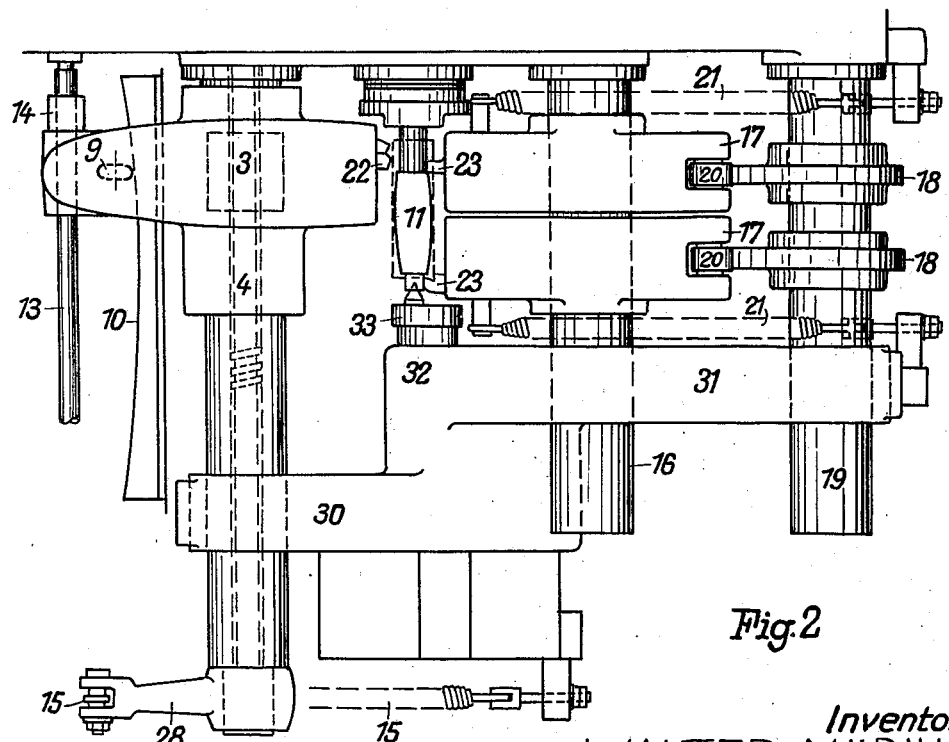
Figure 3:
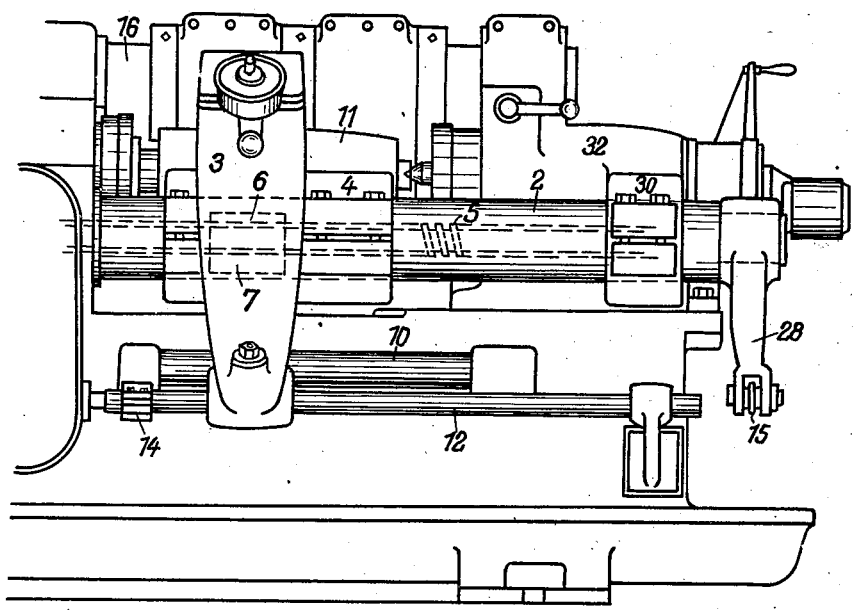
Figure 7:
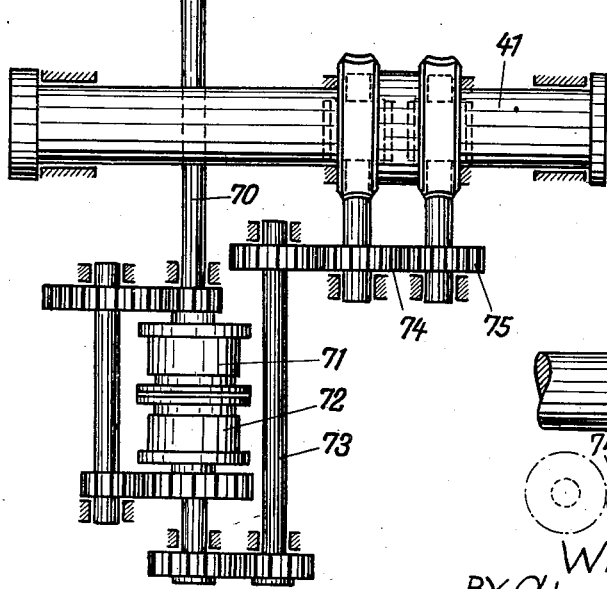
Figure 8:
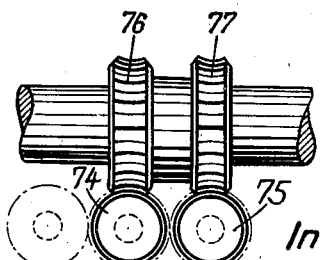
Figure 4:
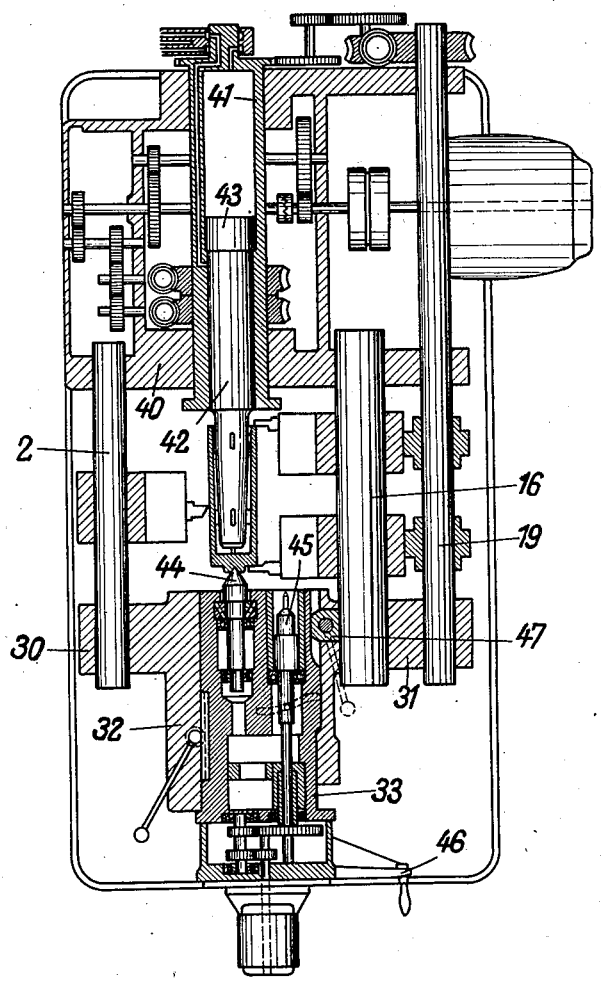

A constructional example of the lathe is illustrated in the accompanying drawings, in which:

Figure 1 is a cross-section through the lathe,
Figure 2 is a plan view of the rear part of the lathe,
Figure 3 is a side elevation,
Figure 4 is a longitudinal section,
Figures 5 and 6 show the clamping mandrel on a larger scale, and
Figures 7 and 8 show the drive of the turning spindle.

In the lathe bed 1 is mounted the guide roller 2 for the rocking tool carriage 3, which is provided with a guide hub 4. In the roller 2 lies the spindle 5, which is set in rotation by the drive of the lathe, and which carries the nut 6 guided with its projecting part 7 in a slot in the roller 2. The nut is connected with the hub 4 by the screws 8.

In the lower part, the carriage 3 carries a guide roller 9, which runs along on the cam 10. By the shaping of the cam, the tool holder is therefore set in rocking motion and the workpiece 11 is provided with a correspondingly curved outer surface. The carriage also engages with the slot 12 through a guide rod 13, which is provided with stops 14, by the contact of which the drive of the lathe is automatically switched off upon termination of the work. At the end of the roller 2 is mounted the arm 28, with which the spring 15 engages, whereby the positive bearing of the holder against the cam and the straight guiding is ensured.

The shaft 16 for the cross rests 17 lies above the axis of rotation. The tool holders are therefore so suspended on these arms that they cannot be displaced, and the tools engage below the axis of rotation with the workpiece; consequently, as in the case of the front tool carriage 3, only tensile forces are set up.

The forward displacement of the tools is effected by the cam discs 18 on the shaft 19, which bear against a guide roller 2 on the cross rests 17. Here also the positive connection is established by the springs 21.

As will be seen from Figure 1, the turning tool 22 therefor lies above, and the parting tool 23 below the axis of rotation, the arrangment being the reverse of the usual arrangement of the tools in turning lathes. It is thus brought about thereby that only tensile forces are exerted on the driving parts of the rocking tool holders. The falling chips are guided by the inclined sliding surface 25 into the collecting bowl 26. The rests for the tool holders are naturally provided in the usual manner with adjusting arrangements of all kinds.

The rollers 2 and 16 for guiding the tool carriage are, in the same way as the shaft 19, mounted on the one hand in the head stock 40 (Figure 4) and on the other hand in arms 30 and 31 of the tail stock 32, which is secured to the lathe bed. The lateral forces which are set up in the guides during the working are therefore directly transmitted by the tail stock to the bed, and no lateral shearing forces are set up on the tail stock.

In the head stock 40, the driving spindle 41 is mounted, which is constructed as a hollow body and serves as a displacement cylinder for the clamping mandrel 42, the rear part of which is constructed as a piston 43. The clamping mandrel clamps the vessel-like workpiece from inside, while the workpiece is held from outside by the dead centre 44. The latter lies in the head 33 constructed in the manner of a revolving turret which also contains one or more drills 45 for drilling and centering the workpiece, the control of these tools being effected by the hand lever and their adjustment by the bolts 47.

For clamping the workpiece, the mandrel 42 is forced out of the position illustrated in Figure 5 until it bears against the workpiece or the stop in the main spindle, whereupon the workpiece is clamped. To this end, pressure oil is passed through the stuffing box 48 by way of the channel 49 behind the piston 43, which lies in the cylinder 50, whereby the clamping mandrel is displaced to the right. The forward movement of the clamping mandrel is limited by the inclined turned surface 51 in the spindle 41 (Figure 6). The clamping mandrel and consequently the bottom portion of the workpiece are thereby always given exactly the same position, so that the workpiece is always correctly adjusted with respect to the tools. The piston 43 then forces the clamping lever 53 by means of the inclined surface 52 into the recess 54, whereby the mandrel is secured against the pressure of the tail stock in the longitudinal direction. By the spring 55 and the sleeve 56, the cam 57 is now forced forward, whereby the centering jaws 58 centre the workpiece. Not until then is the connecting member 59 pressed against the cam 60, whereby the jaws 61 clamp the workpiece. The spring 62 presses the driving member 63 and consequently the guide key 64 against the groove 65 and the inclined surface of the mandrel 42. The guide key 63 thus carries out two functions. In the first place it carries along the mandrel and with it the workpiece, and in the second place it ensures a perfect holding fast of the mandrel and prevents striking of the latter by clamping it in the spindle bore. Upon release, the pressure oil is guided behind the piston 43 through the channel 66 by foot operation. The rear jaws 60 are first released and the operation is then carried out in the inverse manner, the oil forced back being returned through the channel 67 to the oil pump. The spindle 41 is driven by the driving motor 69 in the following manner:

On the driving shaft 70 are mounted the disc couplings 71 (drive without intermediate gearing) and 72 (with intermediate gearing). From here the intermediate shaft 73 is driven and actuates the gear wheels 74 and 75 of the two worm shafts which set in rotation the worm wheels 76 and 77 on the driving shaft. The teeth of the worm wheels are inclined in opposite directions, so that the lateral pressures cancel each other. The worms may also be adjustable in the axial direction. The worm wheels are given small diameters, which are not much greater than the diameters of the lathe spindle, so that the entire arrangement takes up little space. When working with hard metal, only one worm drive is sufficient for the transmission of the torque, while when working with high-speed steel the high torque is transmitted by the two worm wheels without the teeth of the worm wheels being stredded in an inadmissible degree.

What I claim and desire to secure by Letters Patent of the United States is:—

1. In a lathe of low and rigid construction for operating upon workpieces comprising a head-stock and a tail-stock, means in said head-stock for gripping and rotating a workpiece, and guide bars extending between, and fixed at both their ends to, the tail-stock and the head-stock, the combination, with a tool for operating longitudinally of the workpiece, of a tool carrier for said tool made in the form of a two-armed lever slidably and swingably mounted upon a spindle having its center disposed below the level of the axis of rotation of said workpiece, and a second tool carrier made in the form of a one-armed lever is slidably and swingably mounted upon a second spindle located above the axis of rotation of said workpiece, there being tool slide rests and means associated with said tool carriers for gripping tools and applying the same against the workpiece, and the tools being positioned in the same general direction of rotation with respect to the axis of the workpiece so that the tool slide rests will solely be under tension during rotation of said workpiece.

2. A lathe for operating upon workpieces comprising a head-stock and a tail-stock, means in said head-stock for gripping and rotating a workpiece, guide bars extending between, and fixed at both their ends to, the tail-stock and the head-stock, a tool for operating longitudinally of the workpiece, a carrier for said tool, means on the carrier for gripping one of said guides, a feeding means within the gripped guide, a member co-operating with said feeding means and connected with the carrier, a surface plate adjacent said gripped guide, an extension on said carrier for co-operating with the surface member to rock the carrier towards and away from the work, further tools for operating locally upon the workpiece, carriers for such further tools, means on the carriers for gripping said further tools and applying the same to the workpiece at a point below the axis of rotation of the latter, and means on the carriers for gripping the other of said guides, and means for rocking such carriers, and thus rocking said further tools, towards and away from the workpiece.

3. A lathe for operating upon workpieces comprising a head-stock and a tail-stock, means in said head-stock for gripping and rotating a workpiece, guide bars extending between, and fixed at both their ends to, the tail-stock and the head-stock, a tool for operating longitudinally of the workpiece, a carrier for said tool, means on the carrier for gripping one of said guides, a feeding means within the gripped guide, a member co-operating with said feeding means and connected with the carrier, a surface plate adjacent said gripped guide, an extension on said carrier for co-operating with the surface member to rock the carrier, towards and away from the work, further tools for operating locally upon the workpiece, carriers for such further tools, means on the carriers for gripping said further tools and applying the same to the workpiece at a point below the axis of rotation of the latter, and means on the carriers for gripping the other of said guides, and cams arranged adjacent said carriers, rollers upon the carriers and co-operating with said cams to rock the carriers and thus to rock said further tools towards and away from the workpiece.

4. A lathe for operating upon workpieces comprising a head-stock and a tail-stock, means for gripping and rotating a workpiece therebetween, tools for operating upon a workpiece, carrying means for said tools, sub-divided guides for supporting a tool-carrying means upon each subdivision, a rigid connection at one end of said guides to the head-stock and a similar connection at the other end to the tail-stock.

5. A lathe for operating upon workpieces comprising a head-stock and a tail-stock, means in said head-stock for gripping and rotating a workpiece, guide bars extending between, and secured at both their ends to, the tail-stock and head-stock, a tool for operating longitudinally of the workpiece, a carrier for said tool, means on the carrier for gripping one of said guides, a feed screw within the gripped one of said guides, a nut co-operating with said feed-screw, a connection between said nut and carrier, tension means for urging the gripped guide in one direction to cause the carrier and thus the tool to tend to move always towards the workpiece, a surface plate adjacent said gripped guide, an extension on said carrier for co-operating with the surface member to rock the carrier towards and away from the work, further tools for operating locally upon the workpiece, carriers for such further tools, means on the carriers for gripping said further tools and applying the same to the workpiece at a point below the axis of rotation of the latter, and means on the carriers for gripping the other of said guides, and means for rocking such carriers, and thus rocking said further tools, towards and away from the workpiece.

6. In a lathe having a headstock and adapted for operating upon workpieces, a mandrel projecting from said headstock for gripping and rotating hollow vessel-shaped workpieces, a cylindrical driving sleeve to enclose said mandrel, means for displacing the mandrel completely into said headstock from said sleeve, and means operable for drivingly connecting the mandrel and sleeve when the mandrel is displaced from the sleeve.

7. In a lathe for operating upon workpieces, a mandrel for gripping and rotating hollow vessel-shaped workpieces, a cylindrical driving sleeve to enclose said mandrel, a piston operatively connected with the mandrel and located in the sleeve for axial movement under fluid pressure-media, a locking key upon the mandrel, a key-way in the interior of said sleeve arranged and shaped to receive said key when the mandrel is displaced, outwardly expanding jaws in said mandrel for gripping the interior of a workpiece and means operable from said piston for outwardly expanding said jaws after displacement of the mandrel from its enclosing sleeve.

8. In a lathe for operating upon workpieces, a mandrel for gripping and rotating hollow vessel-shaped workpieces, a cylindrical driving sleeve to enclose said mandrel, a backward extension upon said sleeve, an axially displaceable piston located within said extension, ports formed in the latter for the ingress and egress of fluid pressure-media, a connection from the piston to an operating member in the mandrel, centering jaws located in the outer end of the mandrel, gripping jaws located in the mandrel behind said centering jaws, independent axially movable surface-elements within the mandrel for displacing both said jaw sets outwardly, connecting members for moving said elements axially and arranged to extend towards said operating member but to terminate at different distances from such operating member, springs to resist the progressive movement of the connecting members when the operating member is moved in the direction in which they extend, a key upon the mandrel, and a key-way in the sleeve to engage said key when the mandrel is displaced, and a catch pawl upon the mandrel to engage an indentation in the sleeve when said mandrel is displaced.

9. In a lathe for operating upon workpieces, a mandrel for gripping and rotating a hollow vessel-shaped workpiece, a cylindrical driving sleeve to enclose said mandrel and extend into and support said workpiece, means for displacing the mandrel from said sleeve, means operable for drivingly connecting the mandrel and sleeve and fix the workpiece in position upon the latter, a portion of increased cross-sectional dimensions disposed on the backward end of said mandrel and a portion of the interior of said sleeve having increased cross-sectional dimensions to accommodate and retain the said portion of the mandrel when the latter is displaced with respect to the sleeve.

WALTER MÖBIUS.